United States Patent [19]

Mori et al.

[11] 4,258,307

[45] Mar. 24, 1981

[54] VOLTAGE CONTROL APPARATUS FOR A VEHICLE-MOUNTED ALTERNATOR

[75] Inventors: Kazumasa Mori, Aichi; Taro Asahi, Chiryu; Keiichiro Banzai, Toyota; Katsutaro Iwaki, Chiryu; Katsuya Muto, Kariya; Akira Mase, Handa; Takayasu Nimura, Nagoya; Katsumi Itoh, Oobu; Yoshio Akita, Ichinomiya, all of Japan

[73] Assignee: Nippondenso Co., Ltd., Kariya, Japan

[21] Appl. No.: 54,433

[22] Filed: Jul. 3, 1979

[30] Foreign Application Priority Data

Jul. 7, 1978 [JP] Japan .................................. 53-83344

[51] Int. Cl.³ .............................................. H02J 7/14
[52] U.S. Cl. ...................................... 322/28; 320/64; 322/60; 322/73
[58] Field of Search ...................... 322/28, 59, 60, 72, 322/73; 320/64, 68

[56] References Cited

U.S. PATENT DOCUMENTS

| | | | |
|---|---|---|---|
| 3,496,443 | 2/1970 | Snedeker et al. | 322/28 X |
| 3,820,009 | 6/1974 | Itoh et al. | 322/28 |
| 3,835,363 | 9/1974 | Kirk | 322/73 X |
| 3,843,921 | 10/1974 | Hill | 320/64 X |

*Primary Examiner*—Robert J. Hickey
*Attorney, Agent, or Firm*—Cushman, Darby & Cushman

[57] ABSTRACT

When an engine key switch of a vehicle is closed, a rotor coil of a three-phase a.c. alternator adapted to charge a vehicle-mounted battery is excited by a first controlling circuit. Even with the closure of the engine key switch, the exciting current is restricted to a predetermined value by a second controlling circuit before the alternator has reached a predetermined operating state. The operating state of the alternator is monitored by detecting a voltage at the neutral point of a stator coil connected in star of the alternator.

3 Claims, 5 Drawing Figures

VOLTAGE CONTROL APPARATUS FOR A VEHICLE-MOUNTED ALTERNATOR

FIELD OF THE INVENTION

This invention relates to a voltage control apparatus for a vehicle-mounted alternator, and more particularly, to a circuit arrangement for restricting feed of the exciting current to an extent sufficient for the voltage generation to rise.

DESCRIPTION OF THE PRIOR ART

Figure 1:
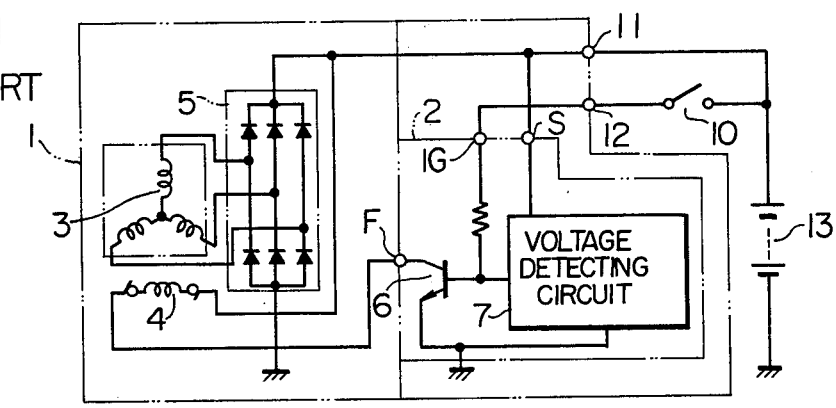
FIGS. 1 and 2 are circuit diagrams of prior art apparatus.
Figure 2:
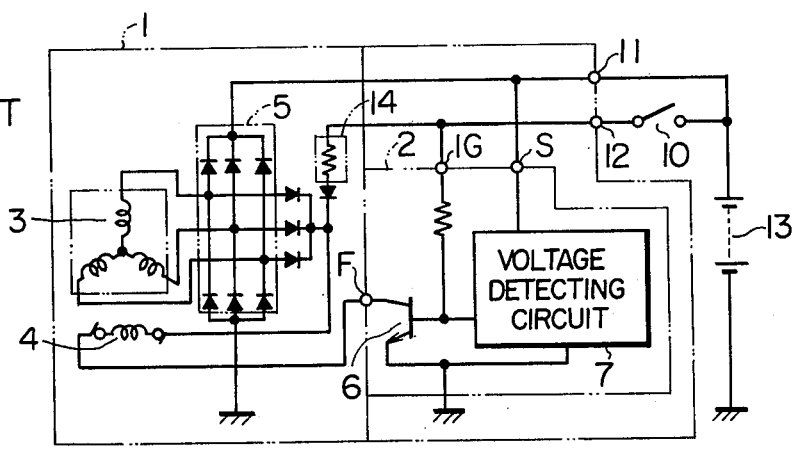

Conventionally, as shown in FIGS. 1 and 2, when an engine key switch 10 is closed, an output transistor 6 is brought into a stationary conductive state to pass an initial exciting current directly from a battery 13 as in a case of FIG. 1 or to pass an initial exciting current via a resistor 14 as in a case of FIG. 2, so that the voltage generation is caused to rise as a generator rotates sympathetically with the rotation of the engine.

Accordingly, if, in the case of FIG. 1, the engine continues not to start after the engine key switch 10 is closed, a large current of about 4A will flow into an exciting coil 4 and consequent rapid discharge of the battery 13 will occur inevitably. In the case of FIG. 2, it is possible to restrict the current flowing into the exciting coil 4 to about 300 mA which is necessary for the voltage generation to rise so that the discharge current may be small even if the engine key switch 10 is inadvertently kept turned on. However, this in turn requires that the resistor 14 be of a relatively large wattage, about 10 watts, resulting in various disadvantages such as increase in size of the alternator, difficulties in assembling, high cost, and difficulties in setting up the circuit in the form of an integrated one.

SUMMARY OF THE INVENTION

This invention contemplates to eliminate the aforementioned disadvantages and has for its object to provide a voltage control apparatus for a vehicle-mounted alternator which does not require a large wattage resistor for restricting the initial exciting current and which can minimize the current discharged from the battery via an exciting coil in the event of failure to inadvertently turn off the engine key switch.

To attain the above object, according to the invention, when the engine key switch is closed, a bias signal is supplied to a control terminal of switching means adapted to drive an exciting coil before an output voltage of an alternator rises, so as to maintain the switching means to be at a predetermined active state in which the exciting current can be suppressed to an extent sufficient for the voltage generation of the alternator to rise.

DESCRIPTION OF THE PREFERRED EMBODIMENTS

Figure 3:
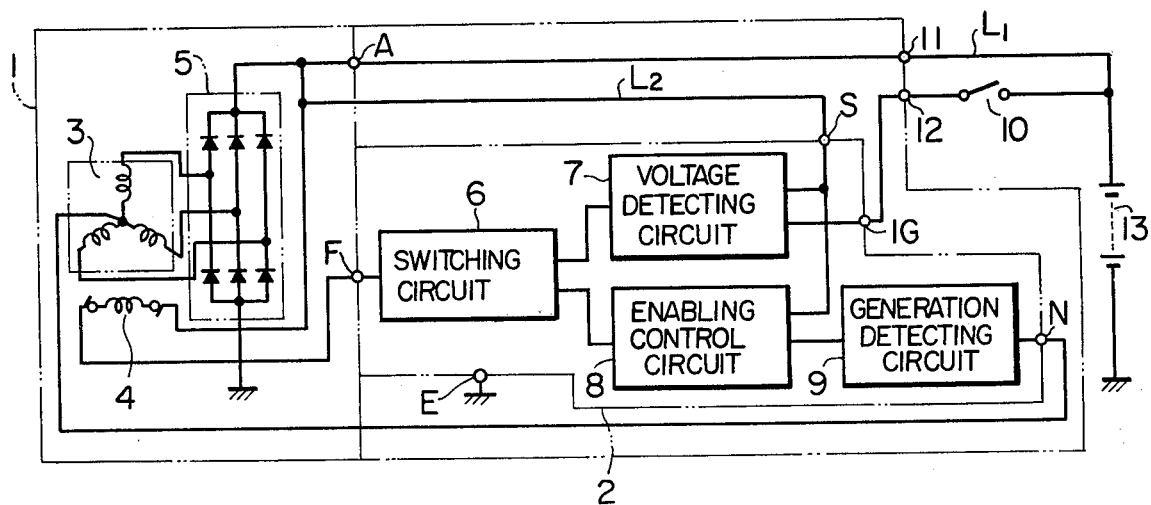
FIG. 3 is an overall circuit diagram of one embodiment of the apparatus according to the invention.

The invention will be described by way of embodiments shown in the drawings. Referring to FIG. 3 which shows a schematic, overall circuit diagram of a voltage control apparatus for a vehicle-mounted, especially, automobile-mounted alternator embodying the invention, there are shown an alternator 1 connected in star to generate a three-phase a.c. voltage, and a voltage control circuit arrangement in block form generally designated at 2 incorporating the main part of the present invention. The alternator 1 comprises an armature coil or a stator coil 3, an exciting coil or a rotor coil 4 for exciting the alternator, and a full-wave rectifier 5. The voltage control circuit arrangement 2 comprises a switching circuit 6 for on-off controlling the conduction of the exciting coil 4, a voltage detecting circuit 7 detecting an output voltage of the armature coil 3 or a charging voltage to a battery 13 and controlling the switching circuit 6 in accordance with the magnitude of this voltage, an enabling control circuit 8 for controlling operation of the switching circuit 6 in such a manner that when an ignition terminal IG is fed with a voltage from power source of the battery 13, the enabling control circuit 8 detects operation of the switching circuit 6 to apply a negative feedback to a controlling terminal of the circuit 8 to thereby maintain the switching circuit 6 to be at a predetermined active state, and a generation detecting circuit 9 for detecting a voltage at the neutral point of the alternator 1. A line $L_1$ including an output terminal A of the alternator 1 is connected to charge the battery 13 and a line $L_2$ connected to the voltage detecting circuit 7, adapted to detect the charging voltage to the battery 13, branches from a point on the line $L_1$. Obviously, one end of the detecting line $L_2$ may be connected directly to the output of the battery 13 in place of being connected to the point on line $L_1$, and an auxiliary rectifier in lieu of the rectifier 5 may be connected to the output terminal of the armature coil 3.

Figure 4:
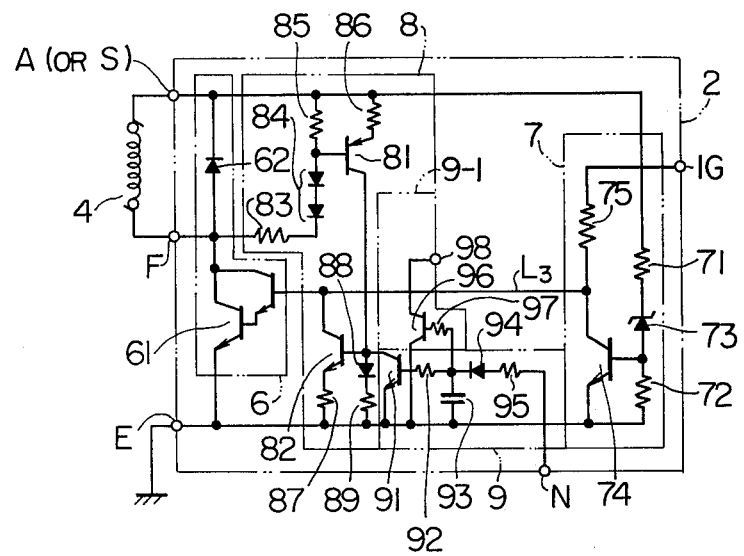
FIG. 4 is a circuit diagram of a specified voltage control circuit arrangement incorporating the invention.

The voltage control circuit arrangement 2 is specifically embodied as shown in FIG. 4. The switching circuit 6 includes a Darlington transistor 61 having the collector connected to one end of the exciting coil 4 and to one end of a flywheel diode 62 acting to absorb the counter electromotive force. The other end of the exciting coil 4 is connected to the output terminal A of the armature coil 3 and the other end of the flywheel diode 62 to an input terminal S. This connection to the input terminal S is electrically equivalent to the connection to the output terminal A since both the terminals are at the same potential. The voltage detecting circuit 7 includes resistors 71 and 72 for dividing voltage at the input terminal S, a constant voltage diode 73 rendered conductive or non-conductive responsive to a divisional voltage, a transistor 74, and a resistor 75 connected at one end to the ignition terminal IG and acting as both a collector resistor for the transistor 74 and a base resistor for the Darlington transistor 61. The voltage detecting circuit 7 operates in the same manner as the prior art apparatus after the engine has started, for maintaining the voltage at input terminal S, i.e., the charging voltage to the battery 13 to a predetermined value.

The enabling control circuit 8 includes a pnp-type transistor 81 operative to follow collector potential of the Darlington transistor 61, an npn-type transistor 82 controlled by collector current of the transistor 81 to control base potential (base current) of the Darlington transistor 61, resistors 83, 85, 86, 87 and 89, and diodes 84 and 88. The outputs of the enabling control circuit 8 and the voltage detecting circuit 7 are wired-OR connected to the Darlington transistor 61. The generation detecting circuit 9 including a transistor 91, a resistor 92, and a smoothing circuit comprised of a capacitor 93, a diode 94 and a resistor 95 operates to turn on the transistor 91 only when voltage at the neutral point of the alternator 1 reaches a predetermined value. A transistor 96 and a resistor 97 constitutes a driver circuit which has an output terminal 98 for connecting thereto a generation indicating circuit (not shown) having a pilot lamp which is turned on or off during the period extending from the closure of the engine key switch to a time at which neutral point voltage of the alternator 1 reaches the predetermined value. The predetermined value of neutral point voltage of the alternator 1 herein corresponds to the full rise of the output voltage of the alternator 1.

In describing operation of the apparatus of the above construction with reference to FIGS. 3 and 4, it is first assumed that the engine key switch 10 is closed to connect the ignition terminal IG to the power source but the alternator 1 is not rotating in advance of starting of the engine or is rotating at low speeds. At this time, the transistor 91 of the generation detecting circuit 9 is turned off. The transistors 81 and 82 of the enabling control circuit 8, on the other hand, are initially turned off so that base current is supplied to the Darlington transistor 61 from the ignition terminal IG via the resistor 75, turning on the transistor 61. Therefore, the exciting current is allowed to flow into the exciting coil 4 and at the same time, base current begins to flow into the transistor 81 of the enabling control circuit 8, turning it on. Thus, collector current of the transistor 81 turns on the transistor 82 so that base current of the Darlington transistor 61 is forced to decrease. As a result, collector potential of the Darlington transistor 61 increases to decrease the exciting current and the base current of the transistor 81, thereby again increasing the base current of the Darlington transistor 61. Eventually, the Darlington transistor 61 is maintained to be at a substantially fixed state in accordance with constants of the resistors 83, 85, 86 and 87 and diode 84 as well as characteristics of the transistors 81 and 82. This fixed state corresponds to an active region which lies between the saturated state and the non-conductive state and which is sufficient to feed an initial exciting current of the order of, for example, 300 to 500 mA to the exciting coil 4 of the alternator 1.

Subsequently, on the background of the above state, a starter not shown is actuated to start the engine and when the rotational speed of the alternator 1 thus increased reaches a predetermined value, the output voltage of the alternator 1 is caused to rise with the initial exciting current. As a result, the neutral point voltage of the alternator 1 is also raised to turn on the transistor 91 of the generation detecting circuit 9, thereby forcibly turning off the transistor 82 of the enabling control circuit 8. This disables the enabling control circuit 8 and thereafter, the Darlington transistor 61 is controlled by the voltage detecting circuit 7 to carry out the ordinary voltage adjustment. More particularly, the transistor 74 is designed to be turned on when the voltage at the input terminal S reaches a predetermined value, for example, 14 to 15 volts by determining the resistors 71 and 72 and the constant voltage diode 73. Then, so long as the detected voltage is below the predetermined value, the Darlington transistor 61 is turned on to excite the exciting coil 4 whereas when exceeding the predetermined value, the Darlington transistor 61 is turned off to deenergize the exciting coil 4. In this manner, the voltage at the input terminal S is adjusted to the predetermined value.

Figure 5:
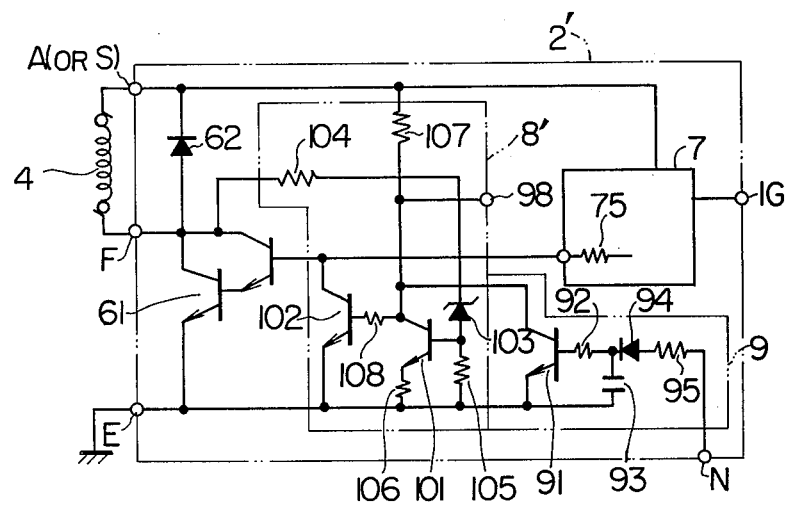
FIG. 5 is a circuit diagram of a modified voltage control circuit arrangement of the invention.

Referring now to FIG. 5, there is shown a modified embodiment of the voltage control circuit arrangement 2 shown in FIG. 4. A voltage control circuit arrangement 2' of this modification is the same as the arrangement 2 of FIG. 4 except for an enabling control circuit 8' and in FIG. 5, the same or like elements as those of FIG. 4 are designated by the same reference numerals. In the enabling control circuit 8', the collector potential of the Darlington transistor 61 is detected by divider resistors 104 and 105 and a constant voltage diode 103 and is used to drive a prestage transistor 101. Reference numeral 102 designates a transistor for controlling the base current to the Darlington transistor 61, and 106, 107 and 108 resistors.

With this construction, immediately before the engine key switch 10 is closed, the transistor 101 is applied with a battery voltage from the battery 13 via line $L_1$ and exciting coil 4 and is turned on, turning off the transistor 102. As the engine key switch 10 is then closed, the battery voltage is applied to the ignition terminal IG and base current flows into the Darlington transistor 61 via the resistor 75 of the voltage detecting circuit 7 to turn on the transistor 61. As a result, the collector potential of the Darlington transistor 61 decreases, turning off the transistor 101 and turning on the transistor 102. This decreases the base current fed to the Darlington transistor 61, thereby again increasing its collector potential. Then, the transistor 106 shifts from the non-conductive state to the conductive state with tendency of returning to the initial state. As the result of the above operation, the Darlington transistor 61 is maintained to be at a substantially fixed active state in accordance with set values of the divider resistors 104 and 105 and the constant voltage diode 103 so that a current of as small as necessary for the initial excitation can be supplied to the exciting coil 4.

As described above, the embodiments of the present invention are featured by the provision of the enabling control circuit 8 or 8' participating in the collector-base negative feedback of the Darlington transistor 61 which in turn is effective to maintain the transistor 61 to be at the desired active state. In this operation, the transistor 61 is compulsory to pass therethrough a collector current of 300 to 700 mA for the initial excitation purpose but heat generated thereby will not damage the transistor 61 which is generally equipped with a heat sink. If the phase of the negative feedback established by the enabling control circuit 8 or 8' is somewhat delayed, slightly oscillatory controlling of the transistor 61 is possible.

While, in the foregoing embodiments, the rise of voltage generation of the alternator 1 was monitored by detecting the neutral point voltage of the alternator with the generation detecting circuit 9, the same purpose may be completed by detecting the output voltage of the alternator 1 or by indirectly detecting the voltage generation through detection of the number of rotation of the engine.

Further, the main part of the voltage control circuit arrangement 2 or 2' may be set up in the form of an integrated circuit.

We claim:

1. A voltage control apparatus for a vehicle-mounted alternator which includes an armature coil, an exciting coil and means for rectifying an a.c. output of said armature coil, comprising:

means connected to said exciting coil, for controlling the magnitude of a current flowing through said exciting coil, said current control means having an active region;

first means connected to said current control means and an engine key switch of a vehicle, responsive to closure of said key switch for controlling said current control means;

second means connected to said current control means and said exciting coil, for maintaining said current control means to be at a predetermined active state irrespective of said first means;

means connected to said alternator, for detecting the operating state of said alternator to produce a detection signal when said alternator has reached a predetermined operating state; and means connected between said detecting means and said second means, for disabling the operation of said second means in response to said detection signal.

2. An apparatus according to claim 1, wherein said detecting means detects a voltage at the neutral point of said armature coil.

3. An apparatus according to claim 1 or 2, wherein said second means includes a transistor.

* * * * *